(12) United States Patent
Kobayashi et al.

(10) Patent No.: US 11,441,667 B2
(45) Date of Patent: Sep. 13, 2022

(54) CONTINUOUSLY VARIABLE TRANSMISSION

(71) Applicant: JATCO Ltd, Fuji (JP)

(72) Inventors: Kazuyoshi Kobayashi, Fuji (JP); Masao Arimatsu, Fuji (JP); Masayuki Furuya, Zama (JP); Kenichi Yamamoto, Fuji (JP); Shogo Fujii, Fuji (JP); Masakazu Tamura, Fuji (JP); Kazuya Numata, Isehara (JP); Hirohisa Yukawa, Machida (JP)

(73) Assignee: JATCO LTD, Fuji (JP)

( * ) Notice: Subject to any disclaimer, the term of this patent is extended or adjusted under 35 U.S.C. 154(b) by 234 days.

(21) Appl. No.: 16/962,062

(22) PCT Filed: Dec. 6, 2018

(86) PCT No.: PCT/JP2018/044819
§ 371 (c)(1),
(2) Date: Jul. 14, 2020

(87) PCT Pub. No.: WO2019/142530
PCT Pub. Date: Jul. 25, 2019

(65) Prior Publication Data
US 2020/0347924 A1 Nov. 5, 2020

(30) Foreign Application Priority Data
Jan. 20, 2018 (JP) .............................. JP2018-007750

(51) Int. Cl.
*F16H 57/01* (2012.01)
*F16G 5/16* (2006.01)
*F16H 9/18* (2006.01)
*F16H 57/035* (2012.01)
*F16H 57/04* (2010.01)

(52) U.S. Cl.
CPC ............... *F16H 57/01* (2013.01); *F16G 5/16* (2013.01); *F16H 9/18* (2013.01); *F16H 57/035* (2013.01); *F16H 57/0489* (2013.01)

(58) Field of Classification Search
CPC ........... F16H 2057/0203; F16H 57/035; F16H 57/031; Y10T 74/2186
USPC ...................................................... 474/8, 144
See application file for complete search history.

(56) References Cited

U.S. PATENT DOCUMENTS

| | | | | |
|---|---|---|---|---|
| 2 A | * | 7/1836 | Goulding | ............... D01G 21/00 57/58.49 |
| 4,738,064 A | * | 4/1988 | Aarts | ..................... G02B 7/007 52/204.5 |
| 4,757,710 A | * | 7/1988 | Haynes | .................. B63H 20/32 220/663 |

(Continued)

FOREIGN PATENT DOCUMENTS

JP 4641319 B2 3/2011
JP 5304917 B2 10/2013

*Primary Examiner* — Henry Y Liu
(74) *Attorney, Agent, or Firm* — Foley & Lardner LLP

(57) ABSTRACT

A continuously variable transmission includes a variator having a belt wound around a pair of pulleys, and a case forming a container chamber for the variator. The pulleys include fixed pulleys and movable pulleys. The belt includes elements stacked to be arranged in an annular form, and rings binding the element stacked. A circumference wall portion of the case is provided with a monitoring hole enabling flank faces of the elements to be monitored.

7 Claims, 6 Drawing Sheets

(56) References Cited

U.S. PATENT DOCUMENTS

| | | | | |
|---|---|---|---|---|
| 4,803,876 A * | 2/1989 | Haynes | F01P 3/202 | 220/663 |
| 5,095,844 A * | 3/1992 | Alexander | G01N 33/2847 | 422/537 |
| 5,522,474 A * | 6/1996 | Burman | F16H 57/0408 | 141/98 |
| 5,643,116 A * | 7/1997 | Genzel | F16H 61/66272 | 474/18 |
| 6,364,797 B1 * | 4/2002 | Ikusue | F02B 61/02 | 180/230 |
| 7,153,229 B2 * | 12/2006 | Matsumoto | B62M 9/126 | 474/144 |
| 7,624,713 B2 * | 12/2009 | Tawarada | G01F 23/02 | 123/196 R |
| 2003/0045394 A1 * | 3/2003 | Kurabayashi | F16H 61/66259 | 477/44 |
| 2005/0109554 A1 * | 5/2005 | Ishikawa | F16H 9/18 | 180/358 |
| 2005/0120777 A1 * | 6/2005 | Cryer | G01M 3/04 | 73/40 |
| 2005/0239591 A1 * | 10/2005 | Schoenek | F16H 57/035 | 474/144 |
| 2005/0239592 A1 * | 10/2005 | Schoenek | F16H 57/021 | 474/144 |
| 2006/0075754 A1 * | 4/2006 | Champion | F02C 7/36 | 60/772 |
| 2008/0006086 A1 * | 1/2008 | Tawarada | G01F 23/02 | 123/198 R |
| 2008/0156560 A1 * | 7/2008 | Shiozaki | F16H 57/0489 | 184/6 |
| 2008/0314676 A1 * | 12/2008 | Ishida | B62K 11/04 | 474/144 |
| 2008/0314677 A1 * | 12/2008 | Shiozaki | F02B 61/02 | 180/219 |
| 2009/0280940 A1 | 11/2009 | Toyohara | | |
| 2010/0167853 A1 * | 7/2010 | Morita | F16H 9/18 | 474/144 |
| 2011/0155082 A1 * | 6/2011 | Takano | F01M 13/04 | 123/41.86 |
| 2012/0073905 A1 * | 3/2012 | Aida | F16H 57/0408 | 184/6.12 |
| 2014/0187365 A1 * | 7/2014 | Kouma | F16H 9/16 | 474/8 |
| 2014/0187366 A1 * | 7/2014 | Kouma | F16H 57/035 | 474/8 |
| 2015/0011344 A1 * | 1/2015 | Ebihara | F16H 63/062 | 474/8 |
| 2015/0308560 A1 * | 10/2015 | Itoo | F16H 57/0489 | 474/146 |
| 2015/0308561 A1 * | 10/2015 | Itoo | F16H 57/027 | 474/146 |
| 2016/0068219 A1 * | 3/2016 | Ozeki | B62K 11/04 | 180/230 |
| 2017/0268671 A1 * | 9/2017 | Fujimoto | F16H 37/043 | |

* cited by examiner

CONTINUOUSLY VARIABLE TRANSMISSION

TECHNICAL FIELD

The present invention relates to a belt continuously variable transmission.

BACKGROUND ART

A transmission mechanism unit (variator) of a belt continuously variable transmission includes a pair of pulleys (a primary pulley and a secondary pulley) and a belt wound around the pair of pulleys.

Patent Documents 1 and 2 disclose a belt for a continuously variable transmission configured with plate-shaped elements, having slit portions on both sides, stacked to be arranged in an annular shape, and with the elements bound by rings inserted through the slit portions.

The elements have flank faces to be in contact with sheave faces of the pulleys, on both sides in the width direction.

In the transmission mechanism unit, rotational driving force (torque) is transmitted between the pair of pulleys via the belt wound around the pair of pulleys.

The flank faces of the elements that come into contact with the sheave faces of the pulley are involved in the transmission of the rotational driving force.

Patent Document 1 discloses the flank faces of the elements having ridge portions that come into contact with the sheave faces via an oil film and groove portions through which a lubricant is discharged in the circumference direction of the pulleys. The ridge portion and the groove portions are formed to be alternately arranged in the radial direction of the pulleys.

An oil film (reaction film) is formed by a lubricant at a contact interface between the flank face and the sheave face.

The groove portion of the flank face has an oil sump depth required for promoting the formation of the reaction film, to prevent the metal contact between the sheave face and the flank face on the belt side.

The ridge portion of the flank face has an initial wear height for not causing wearing of the reaction film formed between the sheave face and the belt.

The torque transmission between the pair of pulleys involves slight slip between the belt and the pulleys, resulting in heat generation of the belt and the pulleys.

When the clamping pressure on the belt by the pair of pulleys is increased to prevent the slipping, contact surface pressure between the flank face of the element and the sheave face increases, resulting in an increase in the heat generated by friction.

The increase in the heat generated by friction results in a higher risk of abnormal wearing and galling on the flank faces of the elements.

This is because the elements and the pulleys are made of metal of the same type, and thus the increase in the heat generation results in a higher risk of adhesion or damage.

Thus, whether the flank face of the belt is damaged needs to be inspected on a regular basis.

For conventional continuously variable transmissions, an oil pan at a lower portion of a transmission case is detached, and an inspection tool is inserted through an opening on the side of the oil pan of the transmission case, to check whether there is a damage.

When the oil pan is detached each time the inspection is performed, a lubricant in the transmission case needs to be temporarily discharged, and thus the inspection requires a cumbersome operation.

In view of this, a solution enabling whether there is a damage to be checked more easily has been called for.

PRIOR ART DOCUMENTS

Patent Document 1: JP4641319B
Patent Document 2: JP5304917B

SUMMARY OF INVENTION

According to an aspect of the present invention, a belt continuously variable transmission includes:

a variator having a belt wound around a pair of pulleys; and a transmission case including a container chamber for the variator.

A desired speed ratio is achieved with a winding radius of the belt changed on each of the pair of pulleys, the container chamber includes a circumference wall portion surrounding an outer circumference of the variator, the pair of pulleys are provided to be rotatable about a pair of rotation axes that are set to be parallel to each other while being separated from each other, inside the circumference wall portion, each of the pair of the pulleys includes a fixed pulley and a movable pulley that is displaceable in a direction along the rotation axes, and is configured to have the winding radius of the belt on the pulley changed in accordance with a displacement of the movable pulley in the direction along the rotation axes, the belt includes elements stacked to be arranged in an annular form; and rings binding the elements stacked, the elements each include flank faces held by the fixed pulley and the movable pulley, on both sides in a width direction, and the circumference wall portion is provided with a monitoring hole enabling the flank faces to be monitored.

With the above aspect of the present invention, whether the flank face of the element is damaged can be easily checked.

DESCRIPTION OF EMBODIMENTS

An embodiment of the present invention will be described below.

Figure 1:
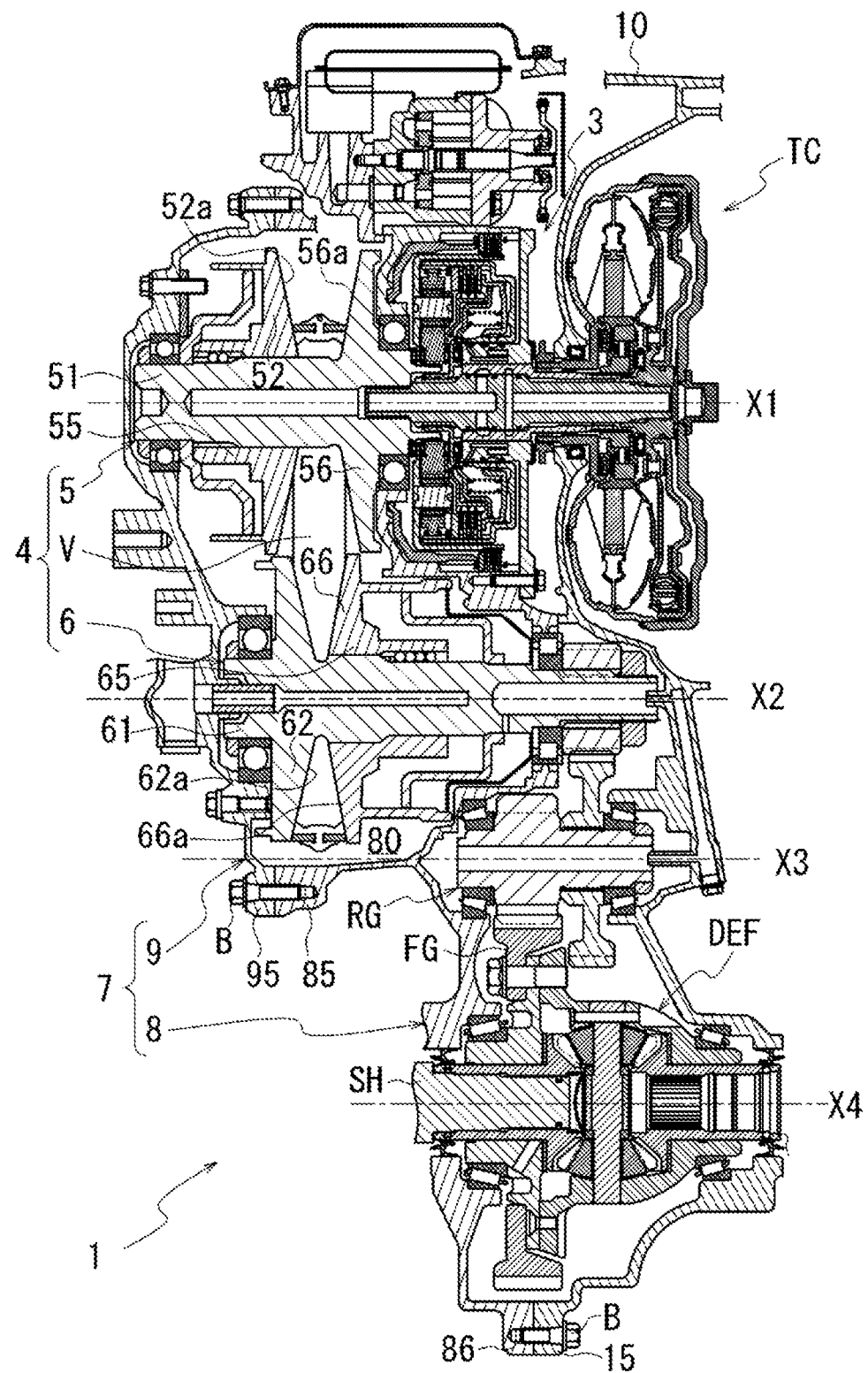
FIG. 1 is a diagram illustrating a continuously variable transmission.

As illustrated in FIG. 1, in a belt continuously variable transmission 1, rotational driving force from an engine (not illustrated) is input to a variator 4 via a torque converter TC and a forward/reverse switching mechanism 3.

The variator 4 includes a pair of pulleys (a primary pulley 5 and a secondary pulley 6) and a belt V wound around the pair of pulleys.

The primary pulley 5 and the secondary pulley 6 are provided to be rotatable about rotation axes X1 and X2 parallel to each other.

The primary pulley 5 includes a fixed pulley 51 and a movable pulley 55 displaceable in a direction along the rotation axis X1.

The fixed pulley 51 and the movable pulley 55 include sheave portions 52 and 56 extending along a radial direction with respect to the rotation axis X1. Surfaces of the sheave portions 52 and 56 facing each other are referred to as sheave faces 52a and 56a inclined with respect to the rotation axis X1.

In the primary pulley 5, a V-shaped groove around which a belt V is wound is formed between the sheave faces 52a and 56a.

In the primary pulley 5, the displacement of the movable pulley 55 in the direction along the rotation axis X1 leads to a change in the groove width of the V-shaped groove, resulting in a change in a winding radius of the belt V in the primary pulley 5.

The secondary pulley 6 also includes a fixed pulley 61 and a movable pulley 65 displaceable in a direction along the rotation axis X2.

The fixed pulley 61 and the movable pulley 65 include sheave portions 62 and 66 extending along a radial direction with respect to the rotation axis X2. Surfaces of the sheave portions 62 and 66 facing each other are referred to as sheave faces 62a and 66a inclined with respect to the rotation axis X2.

In the secondary pulley 6, a V-shaped groove around which a belt V is wound is formed between the sheave faces 62a and 66a.

In the secondary pulley 6, the displacement of the movable pulley 65 in the direction along the rotation axis X2 leads to a change in the groove width of the V-shaped groove, resulting in a change in a winding radius of the belt V in the secondary pulley 6.

Figure 2A:
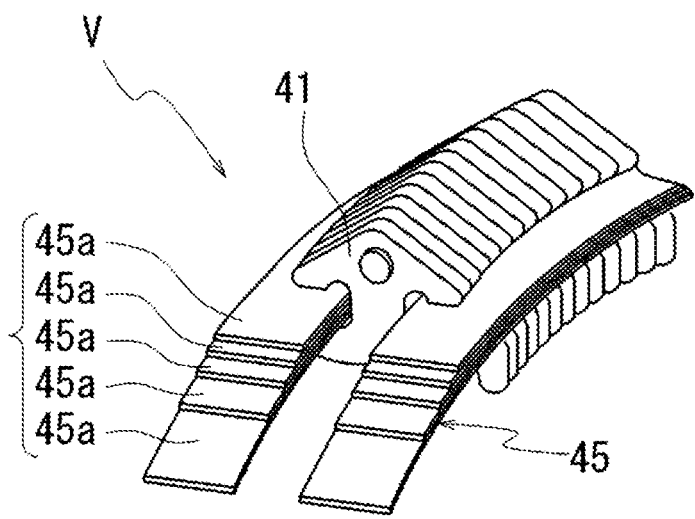
FIGS. 2A-2C are diagrams illustrating a belt of the continuously variable transmission.
Figure 2B:
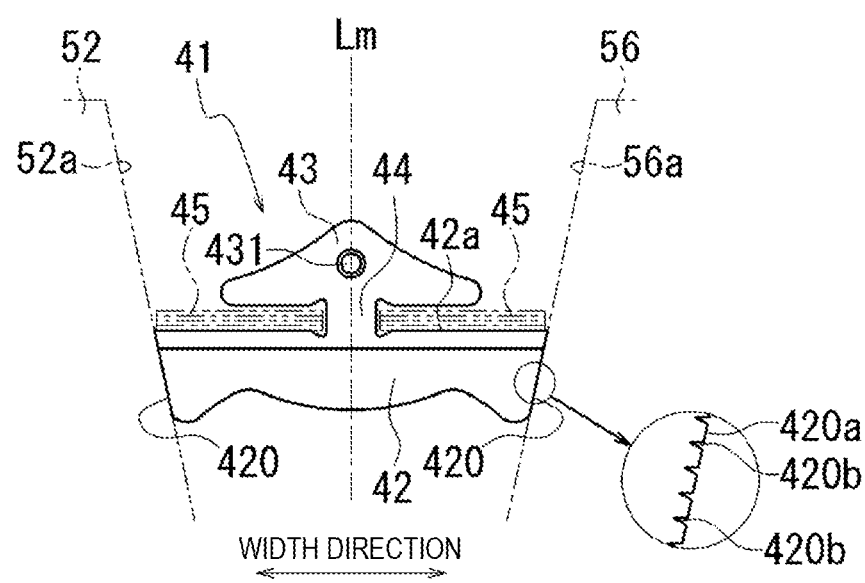
Figure 2C:
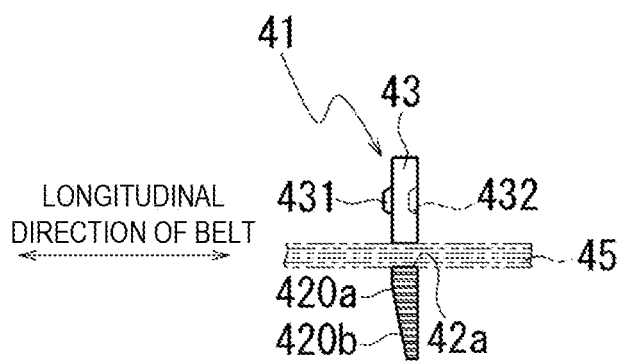

FIGS. 2A-2C are diagrams illustrating a configuration of the belt V. FIG. 2A is a diagram illustrating elements 41 and rings 45 forming the belt V. FIG. 2B is a plan view of the element 41. FIG. 2C is a side view of the element 41.

As illustrated in FIG. 2A, the belt V includes the plurality of elements 41 stacked to be arranged in an annular form, and the rings 45 for binding the stacked elements 41.

The ring 45 is a formed by stacking layers of a plurality of thin-plate rings 45a made of high-strength steel plates into an annular form.

As illustrated in FIGS. 2B and 2C, the element 41 includes a wedge portion 42, a head portion 43, and a connection portion 44 connecting the wedge portion 42 and the head portion 43 to each other.

In the element 41, upper surfaces of the wedge portion 42 on the side of the head portion 43 serves as saddle surfaces 42a on which the rings 45 slide. On both sides of the connection portion 44, the rings 45 are inserted between the saddle surfaces 42a and the head portion 43.

In the belt V, the elements 41 are bound by the pair of rings 45 and 45 positioned on both sides of the connection portions 44.

Both side edges of the wedge portion 42 in the width direction serve as flank faces 420 and 420 inclined by a predetermined angle with respect to a center line Lm of the element 41.

With these flank faces 420 and 420, the wedge portion 42 is formed to have a shape with a width in a direction orthogonal to the center line Lm being smaller at a portion farther from the head portion 43.

In a region of the belt V wound around the primary pulley 5, the flank faces 420 and 420 of the element 41 are held by the sheave face 52a of the fixed pulley 51 and the sheave face 56a of the movable pulley 55 (see the virtual lines in FIG. 2B).

Similarly, in a region of the belt V wound around the secondary pulley 6, the flank faces 420 and 420 of the element 41 are held by the sheave face 62a of the fixed pulley 61 and the sheave face 66a of the movable pulley 65.

The flank faces 420 and 420 each have a plurality of ridge portions 420a and groove portions 420b that are formed to be alternately arranged in an upward and downward direction along the center line Lm.

As illustrated in FIG. 2C, the ridge portions 420a and the groove portions 420b extend in directions along a longitudinal direction of the belt V, and are provided to be in parallel with each other in side view.

In the variator 4, when torque transmission occurs via the belt V, holding force from the sheave portions 52 and 56 acts on the region of the belt V wound around the primary pulley 5 and holding force from the sheave portions 62 and 66 acts on the region of the belt V wound around the secondary pulley 6.

The holding force acts in a direction in which the elements 41 of the belt V are displaced toward the outer side in the radial direction with respect to the rotational axes X1 and X2.

In the belt V, displacement of each of the elements 41 toward the outer side in the radial direction is restricted by the rings 45 and 45 inserted between the saddle surfaces 42a and the head portion 43.

Thus, in the regions of the belt V wound around the primary pulley 5 and the secondary pulley 6, the flank faces 420 and 420 of the elements 41 and the sheave faces 52a, 56a, 62a, and 66a come into contact with each other with frictional force corresponding to the holding force.

Thus, the torque transmission occurs between the belt V and the primary and the secondary pulleys 5 and 6.

During this torque transmission, in the regions of the belt V wound around the primary pulley 5 and the secondary pulley 6, the ridge portions 420a of the flank faces 420 are in contact with the sheave faces 52a, 56a, 62a, and 66a via an oil film.

The groove portion 420b of the flank face 420 functions as a discharge path through which a lubricant is discharged in the longitudinal direction of the belt V.

As illustrated in FIG. 2C, the head portion 43 of the element 41 has one surface provided with a dimple 431 having a protruding shape, and has the other surface provided with a hole 432 having a recessed shape into which the dimple 431 of another adjacent element 41 fits.

With reference to FIG. 1, in the variator 4, when the winding radius of the belt V on the primary pulley 5 and the secondary pulley 6 changes, the rotational driving force input to the primary pulley 5 is changed by a desired speed ratio, and the resultant rotational driving force is transmitted to the secondary pulley 6.

The rotational driving force transmitted to the secondary pulley 6 is transmitted to a reduction gear RG. The reduction gear RG is provided to be rotatable about a rotation axis X3 in parallel with the rotation axis X2, and a final gear FG of a differential DEF is in mesh with the reduction gear RG in a rotation transmittable manner.

Thus, the rotational driving force transmitted from the secondary pulley 6 to the reduction gear RG is transmitted to the differential DEF via the final gear FG. A driving shaft SH coupled to the differential DEF rotates about a rotation axis X4 in parallel with the rotation axis X3, resulting in driving wheels (not illustrated) to which the driving shaft SH is coupled rotating on the basis of the rotational driving force transmitted.

A transmission case 7 of the continuously variable transmission 1 includes: a case 8 including a container chamber 80 for the variator 4; a side cover 9 that is assembled to the case 8 and seals an opening of the container chamber 80; and a housing 10 that contains the torque converter TC.

Figure 3A:
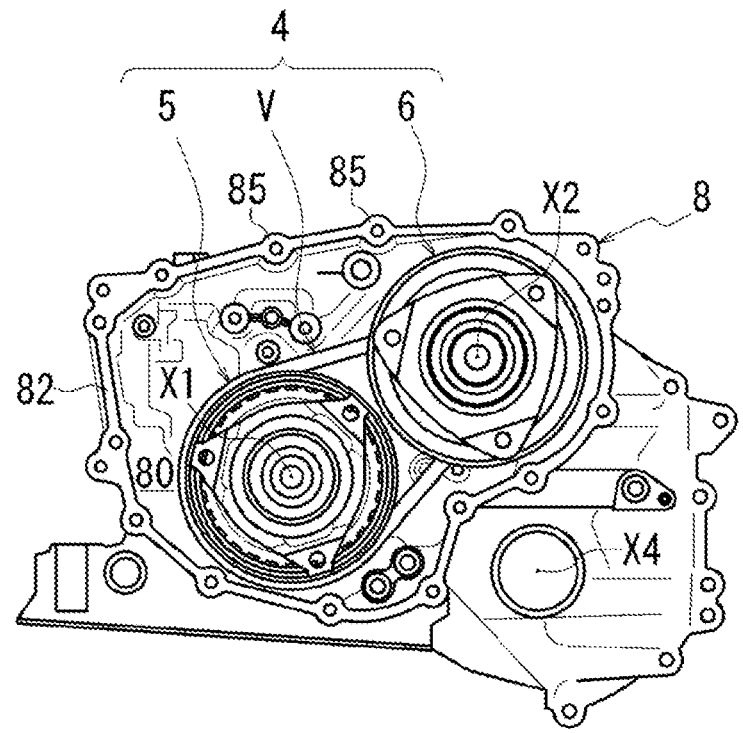
FIGS. 3A and 3B are diagrams illustrating a case of the continuously variable transmission.
Figure 3B:
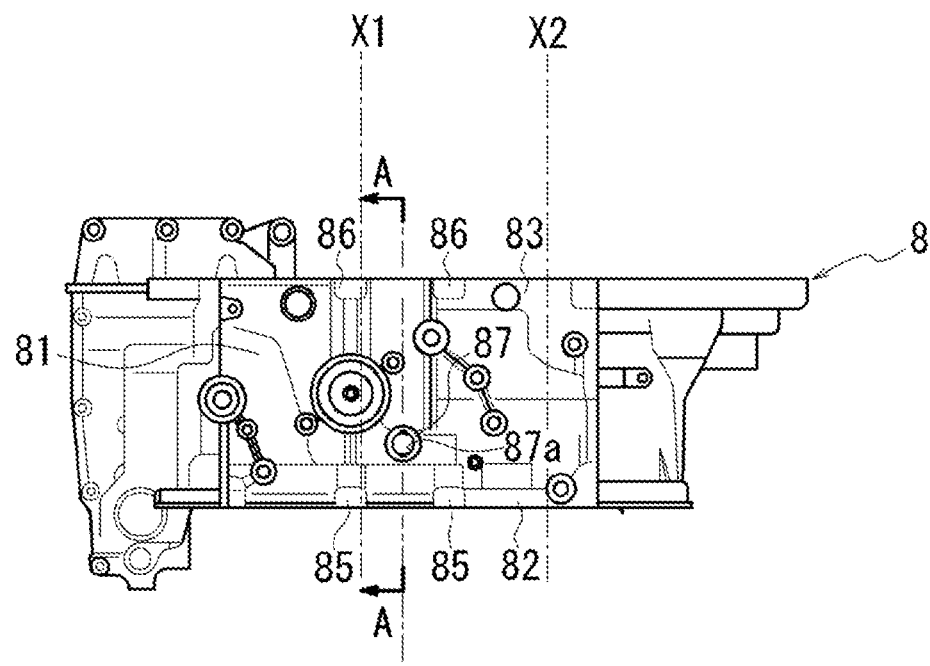

FIGS. 3A and 3B are diagrams illustrating the case 8 of the continuously variable transmission 1. FIG. 3(a) is a diagram illustrating the case 8 as viewed from the side cover 9. FIG. 3(b) is a diagram illustrating the case 8 as viewed from the upper side in a vertical direction based on the installed state of the continuously variable transmission 1.

As illustrated in FIG. 3A, the case 8 as viewed from the side cover 9 is provided with a tubular circumference wall portion 82 surrounding the outer circumference of the variator 4.

The primary pulley 5 and the secondary pulley 6 are provided to be rotatable about the rotation axes X1 and X2, inside the circumference wall portion 82. The rotation axes X1 and X2 are set to be parallel to each other while being separated from each other, inside the circumference wall portion 82.

The circumference wall portion 82 is provided with a plurality of bolt bosses 85 arranged at an interval along the circumference direction.

The inner side of the circumference wall portion 82 serves as the container chamber 80 for the variator 4. The opening of the container chamber 80 can be sealed by the side cover 9 (see FIG. 1).

On the side cover 9, bolt bosses 95 (see FIG. 1) are provided in a circumference edge portion joined to the end surface of a side wall portion 81 (FIG. 3B) on the lower side in the drawing sheet. The bolt bosses 95 are provided at positions corresponding to the bolt bosses 85 on the side of the case 8.

The side cover 9 is attached to the case 8 using bolts B (see FIG. 1) in a state where the circumference edge portion of the side cover 9 contacts the circumference wall portion 82 of the case 8.

As illustrated in FIG. 3B, when the case 8 is viewed from the upper side in the vertical direction based on the installed state of the continuously variable transmission 1, the side cover 9 is fixed to the case 8 from the lower side in FIG. 3B. The housing 10 (see FIG. 1) is fixed to the case 8 from the upper side in FIG. 3B.

The case 8 is further provided with a circumference wall portion 83 surrounding an opening portion towards the housing 10. The circumference wall portion 83 is also provided with a plurality of bolt bosses 86 at an interval along the circumference direction.

The side wall portion 81 on the upper side of the case 8 is provided with a boss portion 87 including a monitoring hole 87a in a region between the rotation axis X1 of the primary pulley 5 and the rotation axis X2 of the secondary pulley 6 (FIG. 3B).

Figure 4A:
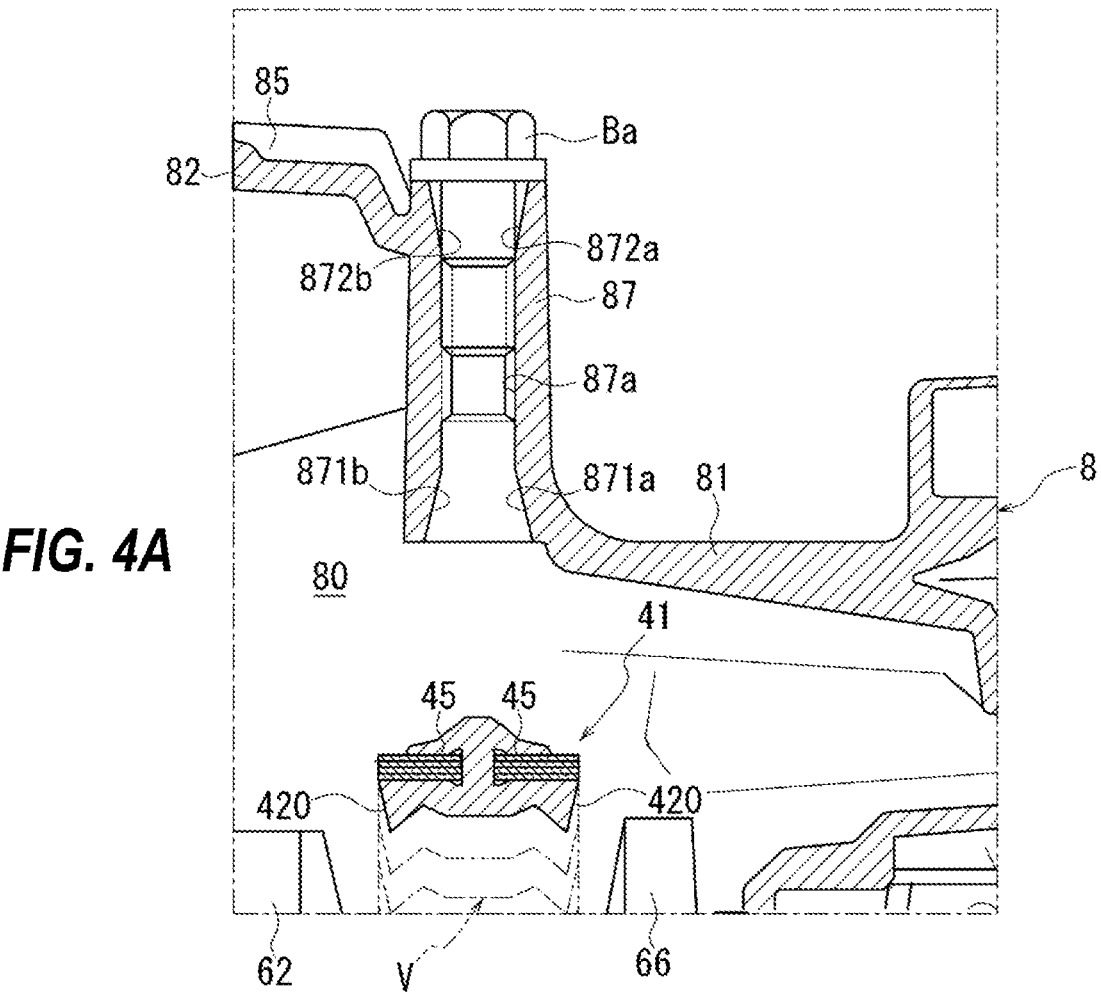
FIGS. 4A and 4B are a diagrams illustrating a monitoring hole provided in the case.
Figure 4B:
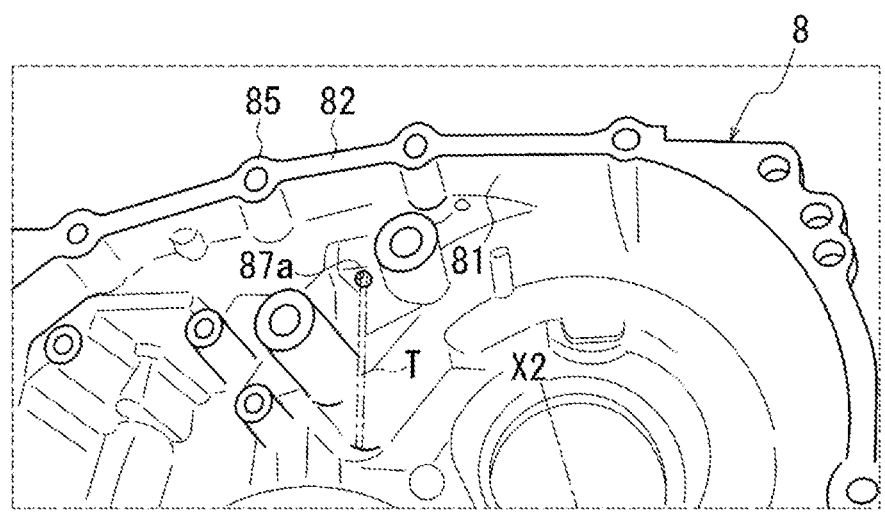

FIGS. 4A and 4B are diagrams illustrating the monitoring hole 87a provided to the case 8.

FIG. 4A is a cross-sectional view of the case 8 taken along line A-A in FIG. 3B. FIG. 4B is a perspective view of the case 8 as viewed from the lower side on the side of an oil pan, and is an enlarged view of a region of the case 8 around the monitoring hole 87a.

In FIG. 4B, a virtual line indicates a bar-shaped inspection tool T inserted through the monitoring hole 87a.

Figure 5A:
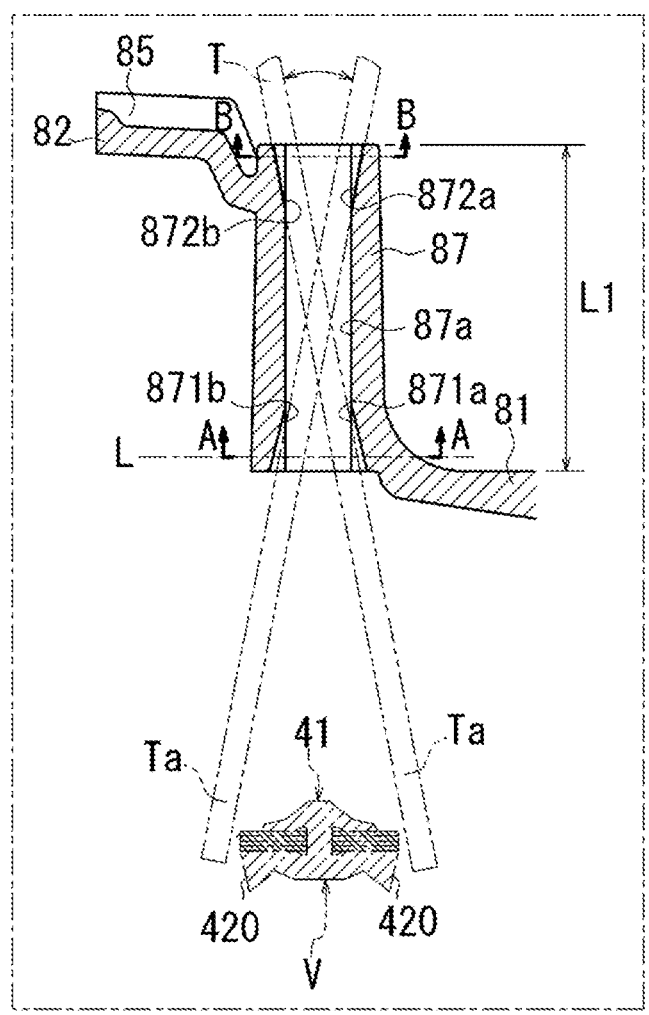
FIGS. 5A-5C are diagrams illustrating the monitoring hole provided in the case.
Figure 5B:
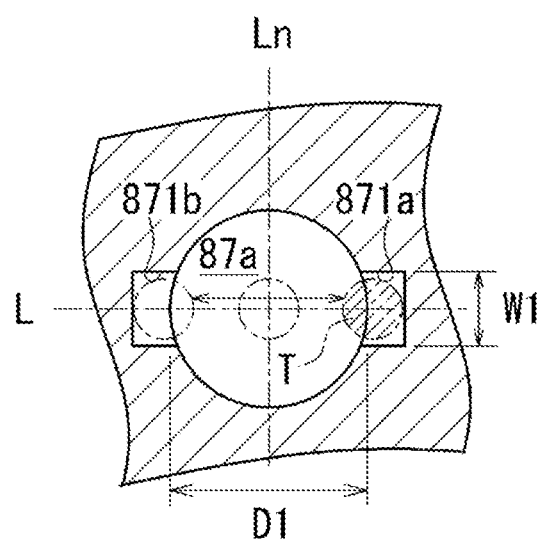
Figure 5C:
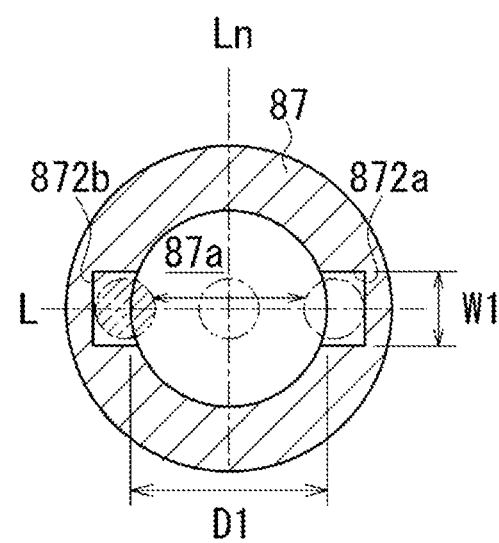

FIGS. 5A-5C are diagrams illustrating positioning grooves 871 (871a, 871b) and 872 (872a, 872b) provided to the monitoring hole 87a.

FIG. 5A is a cross-sectional view of the case 8 taken along line A-A in FIG. 3B, and has a virtual line indicating a distal end portion Ta of the inspection tool T and the element 41. FIG. 5B is a cross-sectional view taken along line A-A in FIG. 5A, and illustrates how the inspection tool T is positioned using the positioning grooves 871 and 872. FIG. 5C is a cross-sectional view taken along line B-B in FIG. 5A, and illustrates how the inspection tool T is positioned using the positioning grooves 871 and 872.

As illustrated in FIG. 4A, the monitoring hole 87a is formed through the side wall portion 81 on the upper side of the case 8, in a thickness direction.

The case 8 has an outer side surface on which the boss portion 87, surrounding the monitoring hole 87a, protrudes in a direction away from the side wall portion 81.

In the present embodiment, the circumference wall portion 82 described above is positioned on the left side in FIG. 4A. The outer circumference edge of the side cover 9 (see FIG. 1) is assembled to the circumference wall portion 82, whereby the container chamber 80 for the variator 4 is formed between the case 8 and the side cover 9.

The monitoring hole 87a is formed to have an opening diameter D1 (see FIGS. 5B and 5C) allowing the insertion of the inspection tool T. The monitoring hole 87a is a through hole communicating the container chamber 80 in the case 8 and the outside of the case 8 to each other, and is substantially linearly formed in the boss portion 87.

In the present embodiment, the positioning grooves 871a, 871b, 872a, and 872b are provided on one and the other ends of the monitoring hole 87a.

In the monitoring hole 87a, the positioning grooves 871a and 871b are provided at end portions on the inner side of the case 8. In the monitoring hole 87a, the positioning grooves 872a and 872b are provided at end portions on the outer side of the case 8.

The opening of the monitoring hole 87a is sealed by a shaft portion of the bolt Ba (see FIG. 4A) screwed on the side of the positioning grooves 872a and 872b of the monitoring hole 87a.

As illustrated in FIG. 5B, the monitoring hole 87a has a circular cross sectional shape, and the positioning grooves 871a and 871b are provided in a positional relationship to be symmetrical about the monitoring hole 87a.

The positioning grooves 871a and 871b are positioned on a diameter line L passing through the center of the monitoring hole 87a. In the present embodiment, the diameter line L is set to be oriented to cross the belt V in the width direction, and the diameter line L crosses the monitoring hole 87a in the width direction of the elements 41 stacked.

The positioning grooves 871a and 871b are formed to have a predetermined width W1 in a direction Ln (the longitudinal direction of the belt V) orthogonal to the diameter line L. The width W1 is set to be a width enabling engagement of the inspection tool T.

As illustrated in FIG. 5C, the positioning grooves 872*a* and 872*b* positioned on the outer side of the case 8 are also positioned on the diameter line L passing through the center of the monitoring hole 87*a*.

The positioning grooves 872*a* and 872*b* are also formed to have the predetermined width W1 in the direction Ln orthogonal to the diameter line L. The width W1 is set to be a width enabling engagement of the inspection tool T.

As illustrated in FIG. 5A, the length L1 in a through direction (the upward and downward direction in FIG. 5A) of the monitoring hole 87*a*, as well as the position and the range of the positioning grooves 871*a*, 871*b*, 872*a*, and 872*b* are set to satisfy the following conditions.

(a) The inspection tool T inserted through the monitoring hole 87*a* can be engaged with one positioning groove 871*a* and the other positioning groove 872*b* while being maintained in the linear state.

The expression "maintained in the linear state" also means that without bending the inspection tool T.

(b) The inspection tool T inserted through the monitoring hole 87*a* can be engaged with one positioning groove 871*b* and the other positioning groove 872*a* while being maintained in the linear state.

(c) The engagement of the inspection tool T with one positioning groove 871*a* and the other positioning groove 872*b* results in the distal end portion Ta of the inspection tool T being disposed at a position to face one flank face 420 of the element 41 in the width direction.

(d) The engagement of the inspection tool T with one positioning groove 871*b* and the other positioning groove 872*a*, results in the distal end portion Ta of the inspection tool T being disposed at a position to face the other flank face 420 of the element 41 in the width direction.

In one example, the positioning grooves 871*a*, 871*b*, 872*a*, and 872*b* each have a triangular shape as illustrated in FIG. 5A.

Thus, when the inspection tool T inserted through the monitoring hole 87*a* is positioned by using the positioning grooves 871*a*, 871*b*, 872*a*, and 872*b*, the distal end portion Ta of the inspection tool T can be swiftly disposed at the position to face the flank face 420.

Figure 6:
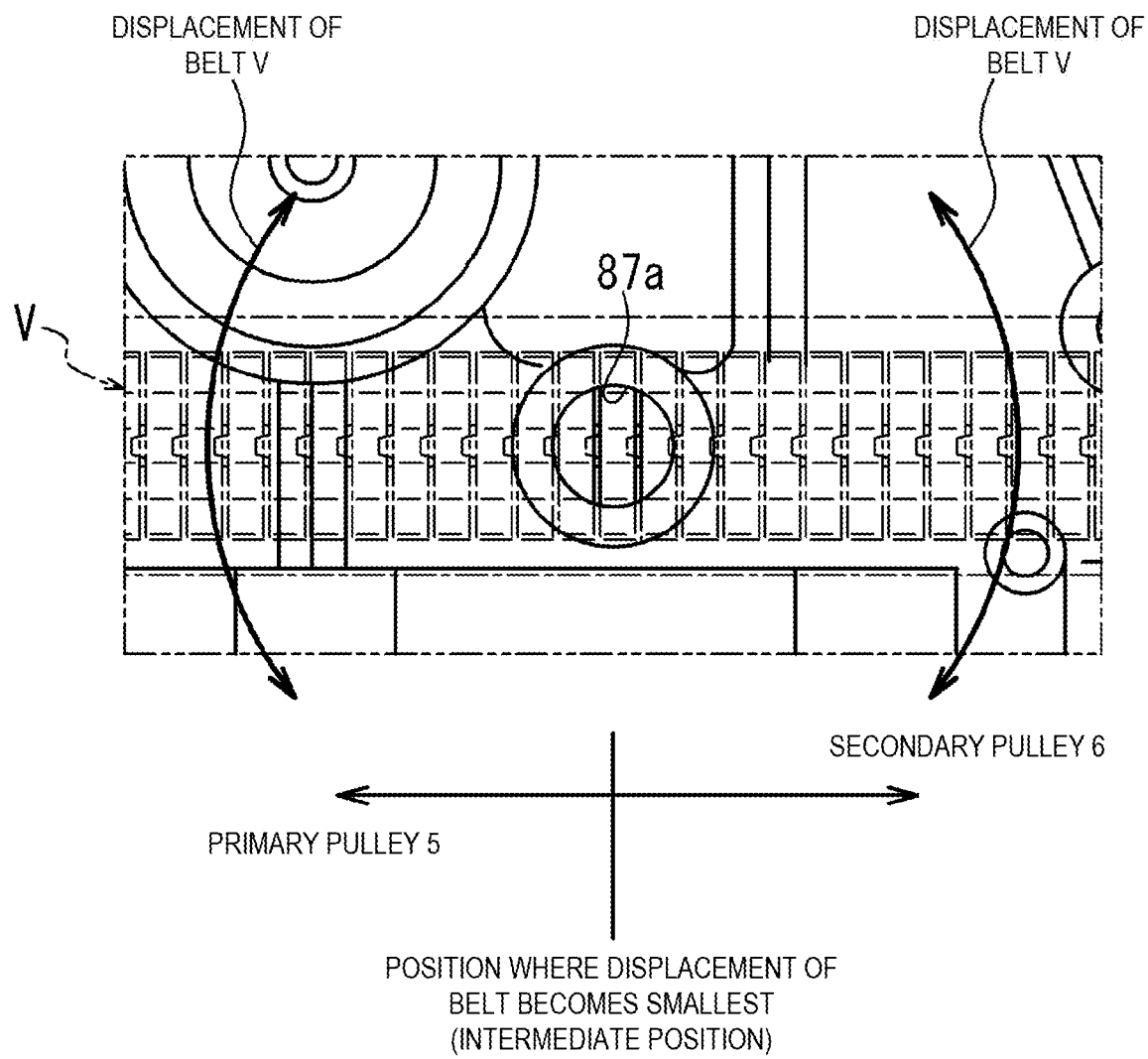
FIG. 6 is a diagram illustrating positional relationship between the monitoring hole and the belt.

FIG. 6 is a diagram illustrating positional relationship between the monitoring hole 87*a* and the belt V. Note that FIG. 6 is a diagram illustrating the case 8 as viewed from the upper side, with a virtual line representing the belt V disposed inside the side wall portion 81.

In the continuously variable transmission 1, when the winding radius of the belt V on each of the pair of pulleys (the primary pulley 5 and the secondary pulley 6) forming the variator 4 changes, speed ratio of the rotational driving force input to the variator 4 changes.

On the primary pulley 5, the winding radius of the belt V changes in response to the displacement of the movable pulley 55 in the direction along the rotation axis X1.

On the secondary pulley 6, the winding radius of the belt V changes in response to the displacement of the movable pulley 65 in the direction along the rotation axis X2.

Thus, in the variator 4, the wound position of the belt V on the primary pulley 5 and the wound position of the belt V on the secondary pulley 6 are displaced respectively in the directions along the rotation axes X1 and X2, on the basis of the speed ratio.

The amount of the displacement of the belt V wound around the pair of pulleys (the primary pulley 5 and the secondary pulley 6) is the largest on the side of the rotation axis X1 of the primary pulley 5 and on the side of the rotation axis X2 of the secondary pulley 6 (see the displacement of the belt in FIG. 6).

At an intermediate position substantially at the middle of the rotation axis X1 and the rotation axis X2 arranged in parallel with each other, the amount of the displacement (misalignment) is the smallest within a range of speed ratio achievable in the continuously variable transmission 1.

A region of the belt V at the intermediate position is not wound around the pair of pulleys (the primary pulley 5 and the secondary pulley 6). In the region of the belt V at the intermediate position, the flank faces 420 of the element 41 are exposed on both sides in the width direction of the belt V.

In the present embodiment as described above, in the side wall portion 81 on the upper side of the case 8, the monitoring hole 87*a* is provided in the region between the rotation axis X1 of the primary pulley 5 and the rotation axis X2 of the secondary pulley 6.

The outer circumference of the region (the region of the belt V at the intermediate position) of the belt V where the amount of displacement in the directions along the rotation axes X1 and X2 is the smallest is positioned on the extension of the through direction of the monitoring hole 87*a*.

As described above, the monitoring hole 87*a* is formed to have a depth enabling the distal end portion Ta of the inspection tool T inserted through the monitoring hole 87*a* to be disposed on one and the other sides in the width direction of the belt V.

Furthermore, in the monitoring hole 87*a*, the positioning grooves 871*a*, 871*b*, 872*a*, and 872*b* are provided at end portions open to inner and outer sides of the case 8.

When the inspection tool T is engaged with the positioning groove 871*a* and the positioning groove 872*b* or the positioning groove 871*b* and the positioning groove 872*a*, the distal end portion Ta of the inspection tool T can be disposed at the position to face one flank face 420 or the other flank face 420 of the element 41.

An example of this inspection tool T includes a fiber scope and a CCD camera. In the present embodiment, a bar-shaped inspection tool T provided with a camera at the distal end portion Ta is used.

Thus, with the positioning grooves 871 and 872, the distal end portion Ta of the inspection tool T can be swiftly disposed at the position to face the flank face 420.

Furthermore, in the case 8, the monitoring hole 87*a* is open at a position above the oil surface of the lubricant in the transmission case 7, in the vertical direction based on the installed state of the continuously variable transmission 1.

Thus, the lubricant in the transmission case 7 will not leak out when the bolt Ba sealing the monitoring hole 87*a* is detached for inserting the inspection tool T into the case 8 for the inspection of the belt V.

As described above, the continuously variable transmission 1 according to the present embodiment has the following configuration:

(1) The belt continuously variable transmission 1 includes:

the variator 4 having the belt V wound around the pair of pulleys (primary pulley 5, secondary pulley 6), and the transmission case 7 (case 8, side cover 9, housing 10) including the container chamber 80 for the variator 4.

In the continuously variable transmission 1, a desired speed ratio is achieved with a winding radius of the belt V changed on each of the pair of pulleys (primary pulley 5, secondary pulley 6).

The container chamber 80 includes the circumference wall portion (side wall portion 81, circumference wall portion 82) surrounding an outer circumference of the variator 4, the pair of pulleys (primary pulley 5, secondary pulley 6) are provided to be rotatable about the pair of rotation axes X1, X2 that are set to be parallel to each other while being separated from each other, inside the circumference wall portion 82.

The pulleys (primary pulley 5, secondary pulley 6) include the fixed pulleys 51, 61 and the movable pulleys 55, 65 that are displaceable in the direction along the rotation axes X1, X2.

The winding radii of the belt V on the pulleys (primary pulley 5, secondary pulley 6) are changed in accordance with a displacement of the movable pulleys 55, 65 in the direction along the rotation axes X1, X2.

The belt V includes the elements 41 stacked to be arranged in an annular form, and rings 45 binding the elements 41 stacked.

The elements 41 include the respective flank faces 420, 420 held by the fixed pulleys 51, 61 and the movable pulleys 55, 65, on both sides in the width direction.

The circumference wall portion 82 is provided with the monitoring hole 87a enabling the flank faces 420, 420 to be monitored.

With this configuration, the flank faces 420 and 420 of the elements 41 forming the belt V can be monitored to appropriately check whether the flank faces 420 and 420 are damaged.

The continuously variable transmission 1 according to the present embodiment has the following configuration.

(2) In the elements 41, the flank faces 420, 420 serve as regions each held by the sheave faces 52a, 62a of the fixed pulleys 51, 61 and the sheave faces 56a, 66a of the movable pulleys 55, 65.

Each of the flank faces 420, 420 is provided with the ridge portions 420a that come into contact with the sheave faces 52a, 62a of the fixed pulleys 51, 61 or the sheave faces 56a, 66a of the movable pulleys 55, 65 via an oil film and the groove portions 420b through which the lubricant OL is discharged in the direction in which the elements are stacked.

The ridge portions 420a and the groove portions 420b are formed to be alternately arranged in the thickness direction of the belt X (radial direction of the rotation axes X1, X2).

With this configuration, wearing of the ridge portions 420a and the groove portions 420b provided to the flank faces 420 and 420 can be appropriately checked.

The continuously variable transmission 1 according to the present embodiment has the following configuration.

(3) The wound position of the belt V around the primary pulley 5 and the wound position of the belt V around the secondary pulley 6 are displaced in the direction along the rotation axes X1, X2 in accordance with the speed ratio of the continuously variable transmission 1.

The monitoring hole 87a is provided at a position in the circumference wall portion 82, enabling monitoring of a region of the belt V involving minimum displacement in the direction along the rotation axes X1, X2.

When the monitored region of the belt V is a region involving a large displacement in the direction along the rotation axes X1 and X2 in accordance with the speed ratio, the monitoring hole needs to be formed to be wider in the displacement direction of the belt V to enable appropriate monitoring of the belt V.

An increase in the size of the monitoring hole leads to a reduction of the rigidity and strength of the case 8 and an increase in the processing cost.

When the monitoring hole 87a is provided at a position enabling monitoring of the region of the belt V involving the minimum displacement in the direction along the rotation axes X1 and X2, the monitoring hole 87a can be prevented from being large. Thus, whether the belt is damaged can be appropriately checked without making the monitoring hole large. Thus, the reduction of the rigidity and strength of the case 8 as well as the increase in the processing cost can be favorably prevented.

The continuously variable transmission 1 according to the present embodiment has the following configuration.

(4) The region of the belt V involving minimum displacement in the direction along the rotation axes X1, X2 is in a region of the belt V not wound around the pulleys (primary pulley 5, secondary pulley 6).

In the region of the belt V not wound around the pulleys (the primary pulley 5 and the secondary pulley 6), the flank faces 420 and 420 of the elements 41 are exposed.

Thus, wearing of the ridge portions 420a and the groove portions 420b provided to the flank faces 420 can be appropriately checked.

The continuously variable transmission 1 according to the present embodiment has the following configuration.

(5) The outer circumference of the region of the belt V involving minimum displacement in the direction along the rotation axes X1, X2 is on an extension of the monitoring hole 87a.

The monitoring hole 87a is formed to have the depth L1 enabling the distal end portion Ta of the inspection tool T inserted through the monitoring hole 87a to be disposed on one and another sides of the belt V in the width direction.

The inspection tool (such as a fiber scope or a CCD camera) is inserted through the monitoring hole 87a to check whether the belt V is damaged.

In this case, when the inspection tool T inserted is held at a position to be in contact with an opening end open in the inner circumference of the case 8 and an opening end open in the outer circumference of the case 8 of the monitoring hole 87a, the distal end portion Ta of the inspection tool T can be disposed at a position to face one of the flank faces 420 in the width direction of the elements 41, and at a position to face the other flank face 420.

Thus, wearing of one flank face 420 and the other flank face 420 of each element 41 in the width direction can be appropriately checked with a monitoring camera or the like provided on the side of the distal end portion Ta of the inspection tool T.

The continuously variable transmission 1 according to the present embodiment has the following configuration.

(6) In the monitoring hole 87a, the positioning grooves 871a, 872b for the inspection tool T are provided at least at an end portion open to inner side of the case 8.

A pair of the positioning grooves 871a, 871b are provided to be in symmetrical positional relationship on the diameter line L along the width direction of the belt V when viewed from the through direction of the monitoring hole 87a.

With this configuration, when the inspection tool T is positioned with one positioning groove 871a, the distal end portion Ta of the inspection tool T inserted through the monitoring hole 87a can be positioned on one side of the belt V in the width direction. When the inspection tool T is positioned with the other positioning groove 871b, the side of the distal end portion Ta of the inspection tool T inserted through the monitoring hole 87a can be positioned on the other side of the belt V in the width direction.

Thus, the inspection tool T can be swiftly disposed at a position suitable for monitoring one flank face 420 of each element 41 in the width direction, and a position suitable for monitoring the other flank face 420.

The continuously variable transmission 1 according to the present embodiment has the following configuration.

(7) In the case 8 of the transmission case 7, the monitoring hole 87a is open at a position above the oil surface of the lubricant OL in the transmission case 7, in the vertical direction based on the installed state of the continuously variable transmission 1.

With this configuration, the lubricant OL in the transmission case 7 will not leak from the monitoring hole 87a, even when the bolt Ba (cap) closing the opening of the monitoring hole 87a is detached for inserting the inspection tool T through the monitoring hole 87a.

Thus, the lubricant OL in the transmission case 7 needs not to be discharged each time whether the belt V is damaged is checked, whereby whether the belt V is damaged can be more easily checked.

While the embodiment of the present invention has been described above, the present invention is not limited to aspects shown in the embodiment. Changes and modifications can be made appropriately within the scope of the technical ideas of the present invention.

The present application claims a priority of Japanese Patent Application No. 2018-7750 filed with the Japan Patent Office on Jan. 20, 2018, all the contents of which are hereby incorporated by reference.

The invention claimed is:

1. A belt continuously variable transmission comprising:
a variator having a belt wound around a pair of pulleys; and
a transmission case including a container chamber for the variator, wherein
a desired speed ratio is achieved with a winding radius of the belt changed on each of the pair of pulleys,
the container chamber includes a circumference wall portion surrounding an outer circumference of the variator,
the pair of pulleys are provided to be rotatable about a pair of rotation axes that are set to be parallel to each other while being separated from each other, inside the circumference wall portion,
each of the pair of the pulleys includes a fixed pulley and a movable pulley that is displaceable in a direction along the rotation axes, and is configured to have the winding radius of the belt on the pulley changed in accordance with a displacement of the movable pulley in the direction along the rotation axes,
the belt includes elements stacked to be arranged in an annular form; and rings binding the elements stacked,
the elements each include flank faces held by the fixed pulley and the movable pulley, on both sides in a width direction, and
the circumference wall portion is provided with a monitoring hole enabling the flank faces to be monitored.

2. The belt continuously variable transmission according to claim 1, wherein
in the elements, the flank faces serve as regions each held by the fixed pulley and the movable pulley, and
each of the flank faces is provided with ridge portions that come into contact with the fixed pulley or the movable pulley via an oil film and groove portions through which a lubricant is discharged in a direction in which the elements are stacked, the ridge portions and the groove portions being formed to be alternately arranged in a thickness direction of the belt.

3. The belt continuously variable transmission according to claim 2, wherein
a wound position of the belt around one of the pair of pulleys and a wound position of the belt around another one of the pair of pulleys are displaced in the direction along the rotation axes in accordance with the speed ratio, and
the monitoring hole is provided at a position in the circumference wall portion, enabling monitoring of a region of the belt involving minimum displacement in the direction along the rotation axes.

4. The belt continuously variable transmission according to claim 3, wherein the region of the belt involving minimum displacement in the direction along the rotation axes is in a region of the belt not wound around the pulleys.

5. The belt continuously variable transmission according to claim 3, wherein
an outer circumference of the region of the belt involving minimum displacement in the direction along the rotation axes is on an extension of the monitoring hole, and
the monitoring hole is formed to have a depth enabling a distal end of an inspection tool inserted through the monitoring hole to be disposed on one and another sides of the belt in the width direction.

6. The belt continuously variable transmission according to claim 5, wherein
in the monitoring hole, a positioning groove for the inspection tool is provided at least at an end portion open to inner side of the transmission case, and
a pair of the positioning grooves are provided to be in symmetrical positional relationship on a diameter line along the width direction of the belt when viewed from a through direction of the monitoring hole.

7. The belt continuously variable transmission according to claim 1, wherein in the transmission case, the monitoring hole is open at a position above an oil surface of a lubricant in the transmission case, in a vertical direction based on an installed state of the continuously variable transmission.

* * * * *